United States Patent [19]

Cardinale

[11] 3,973,327
[45] Aug. 10, 1976

[54] GUAGE FOR GRASS CUTTING

[75] Inventor: John Cardinale, Marlboro, N.J.

[73] Assignee: Lawrence Peska Associates, Inc., New York, N.Y. ; a part interest

[22] Filed: Apr. 30, 1975

[21] Appl. No.: 572,947

[52] U.S. Cl. .................. 33/169 R; 33/1 H; 33/107 R; 33/293; 33/111
[51] Int. Cl.² ...................................... G01C 15/06
[58] Field of Search ............. 33/1 H, 111, 293, 296, 33/294, 295, 107, 169 R

[56] References Cited
UNITED STATES PATENTS

| | | | |
|---|---|---|---|
| 1,195,342 | 8/1916 | Ducklow | 33/296 |
| 1,320,352 | 10/1919 | Werner | 33/1 H |
| 2,140,714 | 12/1938 | Palmer | 33/111 |
| 2,517,159 | 8/1950 | Allen | 33/111 X |
| 3,516,171 | 6/1970 | Martin | 33/293 |
| 3,638,317 | 2/1972 | Felix | 33/293 |

Primary Examiner—William D. Martin, Jr.
Attorney, Agent, or Firm—Jack D. Slobod

[57] ABSTRACT

A gauge for determining the height to which grass should be cut is configured as an elongated strip having a reference edge at one end adapted to be placed against the ground. On the strip there are plural sets of different indicia, with two longitudinally spaced apart corresponding discrete markings in each set, one for grass height before cutting and the other for height after cutting. The distances of the two markings in each set from the reference edge follow a three to two ratio. The correspondence between markings is indicated either by color or by alphanumeric symbols.

5 Claims, 3 Drawing Figures

GUAGE FOR GRASS CUTTING

FIELD OF THE INVENTION

The present invention relates generally to gauges for proportional measurement. In its particular aspects the present invention relates to a gauge having plural sets of corresponding pairs of discrete markings, the markings of each set indicating a pair of distances in a constant ratio.

BACKGROUND OF THE INVENTION

In the cutting of lawn grass it is known that it is improper to always cut grass to the same final height irrespective of the starting height. This is because if too large a proportion of the height of the grass is removed in one cutting, the grass may die from the sudden loss of an inordinate amount of photosynthesis ability. Generally, it is considered that only one third of the grass height should be removed to prevent the aforementioned shock effect. While the above facts are known by professional gardeners, they seem not to have reached the general public. In addition to the problem of educating the general public to these facts, there is a further problem of the ability of the general public to utilize these facts armed with just a ruler. Therefore, it is adviseable to provide a specialized gauge for grass cutting which can be utilized in a manner making error highly improbable.

OBJECTS OF THE INVENTION

It is an object of the present invention to provide a gauge for indicating the height to which grass should be cut.

It is a further object of the present invention to provide a gauge for proportional measurement which may be used in a foolproof manner avoiding mental calculation.

SUMMARY OF THE INVENTION

Briefly, the aforementioned and other objects of the present invention are satisfied by providing a gauge configured as an elongated strip on which are disposed discrete markings. The gauge has a reference edge at one end adapted to be placed against the ground by thrusting into the ground a stake secured to the strip and projecting from the reference edge. The provision of the stake avoids error by making it quite clear which end of the strip is to abut the ground.

The markings are organized as plural differently coded sets of two indicia each. The two indicia of each set, which are indicated as corresponding by color coding or alphanumeric symbols, are respectively representative of the starting height and the final cut height of the grass. By providing correspondingly coded pairs of discrete indicia disposed along the strip at distances from the reference edge in accordance with the required constant ratio, mental calculation is completely eliminated, making the gauge virtually foolproof.

Other objects, features and advantages of the present invention will become apparent upon perusal of the following detailed description of two alternate embodiments thereof when taken in conjunction with the appended drawing wherein.

DETAILED DESCRIPTION

Figure 1:
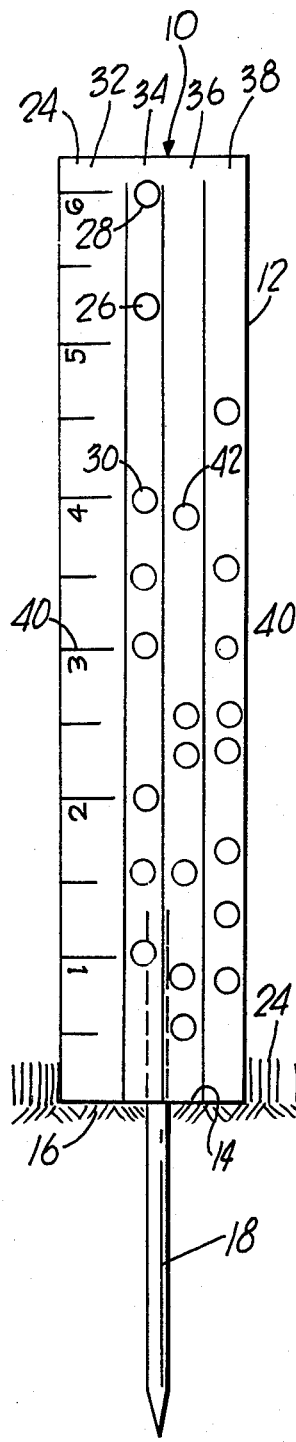
FIG. 1 is a front view of the grass cutting gauge of the present invention.
Figure 2:
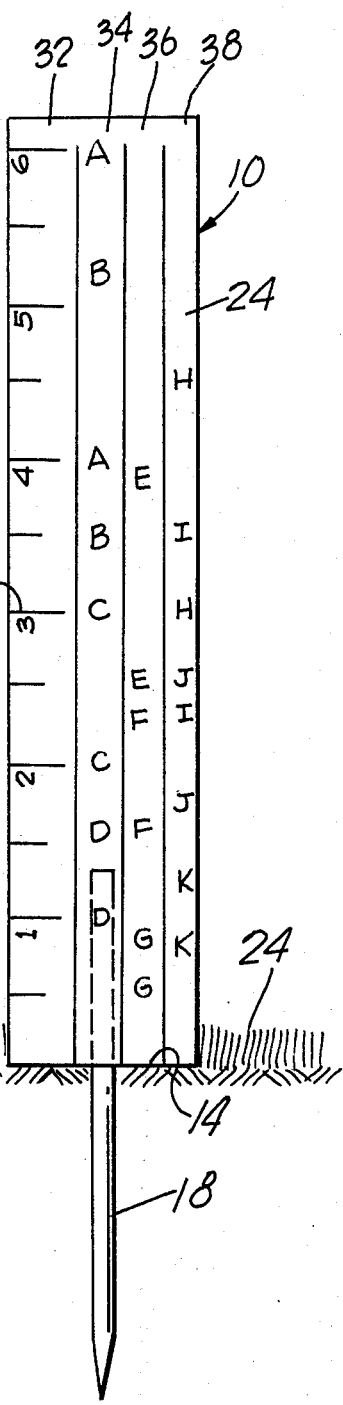
FIG. 2 is a front view, similar to FIG. 1, but of a grass cutting gauge of an alternate embodiment.
Figure 3:
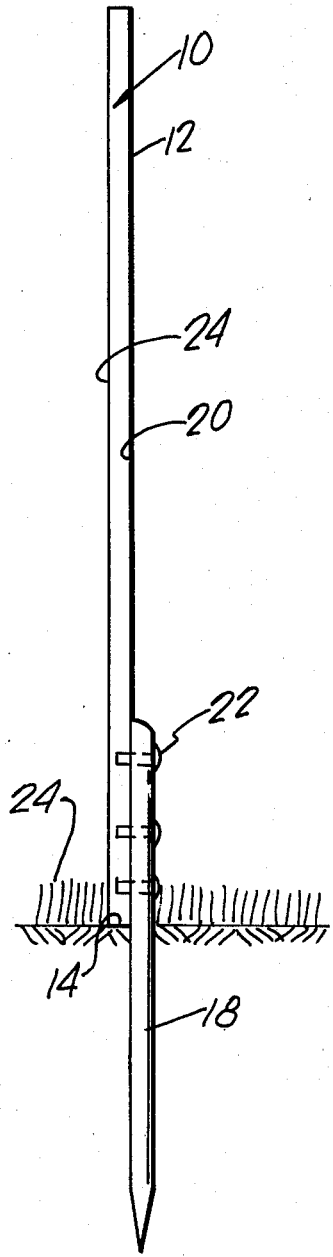
FIG. 3 is a side view from the right side of either FIGS. 1 or 2.

Referring simultaneously to FIGS. 1 through 3, the grass cutting gauge 10, in common in the alternative embodiments illustrated in FIGS. 1 and 2, comprises an elongated rectangular strip 12, generally in the shape of a ruler of approximately six inches in length. Strip 12 further has a transversely directed narrow edge 14 at one end which is adapted to abut the ground 16, with the strip oriented vertically. For supporting the strip 12, there is provided an elongated pointed rod or stake 18 which is secured to the back face 20 of strip 12, near edge 14, as by screws 22. Stake 18 projects longitudinally from the strip 12 perpendicular to the edge 14 and is adapted to be thrust into the ground to support strip 12 with edge 14 resting on the surface of the ground 16 and serving as a reference line.

The front face 24 of strip 12 is provided with various markings or indicia which are utilized for determining to what height the grass 24 surrounding the gauge 10 should be cut. It is these indicia which are somewhat different in the alternative embodiments depicted in FIGS. 1 and 2.

Referring to FIG. 1, the front face 24 of gauge 10 has a plurality of longitudinally spaced apart color coded symbols such as dots 26. The dots 26 are organized in sets of two similarly colored elements which are disposed at distances from reference edge 14 in the ratio of 3 to 2. Thus the highest dot in each set is indicative of the height of grass 24 prior to cutting while the lowest dot in the set is indicative of the height to which the grass having that initial height should be cut to. The dots of each set is of a different color to distinguish between sets. Thus, for example, there is a green dot 28 disposed six inches from line 14, indicative of the starting or uncut height and a green dot 30 below dot 28 disposed four inches from line 14 indicative of a cut grass height, corresponding to that starting height, wherein one third of the initial height is removed. Since FIG. 1 is not in color it should be noted that those pairs of dots 26 which are of the same color can be ascertained easily from FIG. 2 in which alphabetic symbols indicate corresponding positions.

For convenience, the face 24 of guage 10 is divided into four vertical columns 32, 34, 36 and 38 from left to right. The leftmost column 32, is provided with ruler graduations 40, so that gauge 10 may be also used as a ruler. The other three columns are for dots 26, and are utilized to simplify finding the corresponding dots. Thus if one dot in a set, such as dot 28 is in a particular column, the other dot 30 comprising the set is in the same column, column 34 in this case. Thus the sets may be placed in different columns, limiting the number of dots which must be examined by the eye at one time. Furthermore, the use of columns allows a final cut height dot such as dot 30 to be placed next to an initial height dot such as dot 42, in another column.

Referring next to FIG. 2, in an alternate embodiment sets of alphanumeric symbols are marked on face 24 instead of colored dots as in FIG. 1. Thus, for example green dots 28 and 30 in column 34 in FIG. 1 are each replaced by the simple "A" in column 34 in FIG. 2. Similarly there are longitudinally spaced apart pairs of symbols with markings of "B" through "K" disposed on face 24. Again as in FIG. 1, the corresponding markings set off distances in the ratio of three to two from reference line 14, the topmost symbol of each set being indicative of initial grass height, and the bottom most symbol of each set being indicative of the corresponding height to which grass should be cut.

It should be apparent that the use of correspondingly marked pairs of discrete symbols or indicia eliminates the need for mental calculation in determining the height to which grass should be cut.

Having described two embodiments of my invention in detail it is apparent that various modifications, additions and omissions are possible to the details thereof within the spirit and scope of the invention. Accordingly, reference as to the scope of the invention should be made to the following claims.

What is claimed is:

1. A gauge adapted for determining the height to which grass should be cut in a lawn comprising an elongated strip having an elongated face thereon, said face having a transversely directed edge at one end serving as a reference, a plurality of sets of different indicia having different lengths on said face, each set consisting of only two longitudinally spaced apart correspondingly discrete indicia, the lengths of the indicia in each set from said reference being in a constant ratio of substantially two to three, the two indicia of said set having identical visual characteristics for indicating correspondence therebetween, and the indicia of different sets having different visual characteristics for for indicating a lack of correspondence therebetween.

2. The gauge of claim 1 wherein the indicia comprise markings having a different color for each set.

3. The gauge of claim 1 wherein the indicia comprise alpha-numeric symbols, there being a different symbol for each set.

4. The gauge of claim 1 further comprising an elongated stake secured to said strip at one end and directed perpendicular to said reference edge, said stake configured to be thrust into the ground.

5. The gauge of claim 1 wherein said face is divided into plural columns running the length of said face, different ones of said sets of indicia being located wholly in different ones of said columns.

* * * * *